(12) United States Patent
Lin et al.

(10) Patent No.: US 7,414,686 B2
(45) Date of Patent: *Aug. 19, 2008

(54) IN PLANE SWITCHING LIQUID CRYSTAL DISPLAY

(75) Inventors: Tze-Min Lin, Miao-Li (TW); Chueh-Ju Chen, Miao-Li (TW); Jia-Pang Pang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 339 days.

This patent is subject to a terminal disclaimer.

(21) Appl. No.: 11/224,205

(22) Filed: Sep. 12, 2005

(65) Prior Publication Data

US 2006/0055860 A1    Mar. 16, 2006

(30) Foreign Application Priority Data

Sep. 10, 2004    (TW)    .............................. 93127582 A

(51) Int. Cl.
  *G02F 1/1337*    (2006.01)
  *G02F 1/1343*    (2006.01)
(52) U.S. Cl. ...................................... 349/123; 349/141
(58) Field of Classification Search ................. 349/141, 349/123–124
See application file for complete search history.

(56) References Cited

U.S. PATENT DOCUMENTS

| | | | | |
|---|---|---|---|---|
| 5,995,186 A * | 11/1999 | Hiroshi | ........................ | 349/141 |
| 6,266,116 B1 * | 7/2001 | Ohta et al. | ................... | 349/141 |
| 6,288,763 B1 * | 9/2001 | Hirota | ......................... | 349/141 |
| 6,400,430 B2 * | 6/2002 | Nakao et al. | ................... | 349/89 |
| 6,859,248 B2 * | 2/2005 | Matsumoto et al. | .......... | 349/141 |
| 6,950,167 B2 * | 9/2005 | Matsumoto et al. | .......... | 349/141 |

FOREIGN PATENT DOCUMENTS

| | | |
|---|---|---|
| EP | 0806698 | 11/1997 |
| JP | H07-333598 A | 12/1995 |

* cited by examiner

*Primary Examiner*—James A Dudek
(74) *Attorney, Agent, or Firm*—Wei Te Chung

(57) ABSTRACT

An IPS liquid crystal display (200) includes a first substrate (21) and a second substrate (22) opposite to each other, and a twisted nematic liquid crystal layer (25) sandwiched between the first and second substrates. A first polarizer (23) is disposed at an outer surface of the first substrate, and a second polarizer (24) is disposed at an outer surface of the second substrate. Polarizing axes of the first and second polarizers are parallel to each other. A plurality of pixel electrodes (27) and common electrodes (26) are disposed at the second substrate. A first alignment film (213) is disposed at an inner surface of the first substrate, and a second alignment film (224) is disposed at an inner surface of the second substrate. The first alignment film maintains a rubbing angle of approximately 90° relative to the second alignment film.

14 Claims, 9 Drawing Sheets

IN PLANE SWITCHING LIQUID CRYSTAL DISPLAY

FIELD OF THE INVENTION

The present invention relates to liquid crystal displays, and particularly to an IPS LCD (in-plane switching liquid crystal display).

GENERAL BACKGROUND

In order to obtain a wide viewing angle, the IPS (in-plane switching) type LCD has been developed. FIG. 9 is a schematic, exploded isometric view of a conventional IPS LCD 100. The IPS LCD 100 includes a first substrate 11, a second substrate 12 opposite to the first substrate 11, and a liquid crystal layer 15 sandwiched between the substrates 11, 12. The liquid crystal layer 15 includes liquid crystal molecules 18. A first and a second polarizers 13, 14 are formed at outer sides of the substrates 11, 12 respectively. A plurality of pixel electrodes 16 and common electrodes 17 are disposed parallel to each other at an inner surface of the second substrate 12. A first alignment layer (not shown) is disposed at an inner surface of the first substrate 11. A second alignment layer (not shown) is disposed at the inner surface of the second substrate 12, covering the pixel electrodes 16 and common electrodes 17. Original rubbing directions of the first alignment layer and the second alignment layer are parallel to each other. Long axes of liquid crystal molecules 18 adjacent to the alignment layers are approximately parallel to the first substrate 11 and the second substrate 12. Polarizing axes of the first and second polarizers 13, 14 are perpendicular to each other.

When no voltage is applied, the long axes of the liquid crystal molecules 18 maintain an angle relative to the pixel and common electrodes 16, 17. Light beams are emitted from a back light module (not shown) underneath the second substrate 12. When the light beams pass through the liquid crystal layer 15, their polarizing directions do not change, and the light beams are absorbed by the first polarizer 13. Thus the IPS LCD 100 is in an "off" state, and cannot display images.

As shown in FIG. 10, when a voltage is applied to the pixel and common electrodes 16, 17, an electric field E1 is generated between the pixel and common electrodes 16, 17. A direction of the electric field E1 is parallel to the second substrate 12, and perpendicular to the pixel and common electrodes 16, 17. The long axes of the liquid crystal molecules 18 twist to align in the direction of the electric field E1. Light beams exiting from the second polarizer 14 pass through the liquid crystal layer 15, and the polarization state of the light beams is converted to match the polarizing axis of the first polarizer 13. Thus the light beams pass through the first polarizer 13 to display images, and the IPS LCD 100 is in an "on" state.

However, before the voltage is applied, all the liquid crystal molecules 18 are aligned in the same direction. When the voltage is applied and the liquid crystal molecules 18 twist to align in the new direction according to the electric field E1, the amount of time needed for all the liquid crystal molecules 18 to twist is unduly long. This means that the response time of the IPS LCD 100 is unduly long.

What is needed, therefore, is an IPS LCD which overcomes the above-described problems.

SUMMARY

One preferred embodiment provides an IPS LCD, which includes a first substrate and a second substrate opposite to each other, and a twisted nematic liquid crystal layer sandwiched between the first and second substrates. A first polarizer is disposed at an outer surface of the first substrate, and a second polarizer is disposed at an outer surface of the second substrate. Polarizing axes of the first and second polarizers are parallel to each other. A plurality of pixel and common electrodes are disposed at the second substrate. A first alignment film is disposed at an inner surface of the first substrate, and a second alignment film is disposed at an inner surface of the second substrate. The first alignment film maintains a rubbing angle of approximately 90° relative to the second alignment film.

Because an anchoring strength of the second alignment film is smaller than that of the first alignment film, the liquid crystal molecules easily twist to the positions in which they are aligned with an electric field. The linearly-polarized light can then immediately pass through the polarizers for display. The liquid crystal molecules twist in a short time by the effect of the electric field E2 improves the response time of the IPS LCD.

Other advantages and novel features will become more apparent from the following detailed description when taken in conjunction with the accompanying drawings.

DETAILED DESCRIPTION OF THE PREFERRED EMBODIMENTS

Reference will now be made to the drawings to describe the preferred embodiments in detail.

Figure 1:
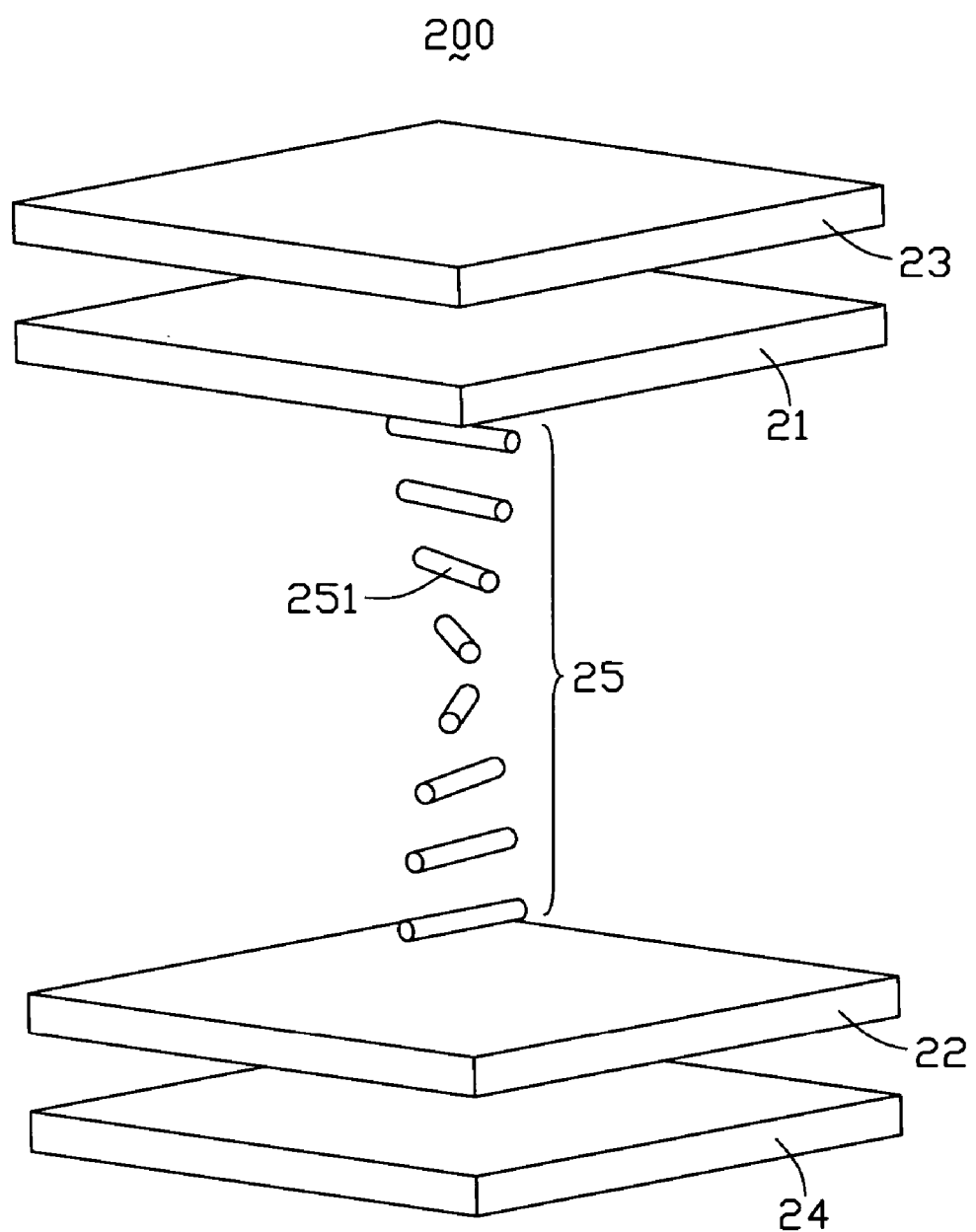
FIG. 1 is a schematic, exploded isometric view of an IPS LCD according to a first embodiment of the present invention, showing the IPS LCD in an off state.

FIG. 1 is a schematic, exploded isometric view of an IPS LCD 200 according to the first embodiment of the present invention, showing the IPS LCD 200 in an off state. The IPS LCD 200 includes a first substrate module 21, a second substrate module 22 opposite to the first substrate 21, and a liquid crystal layer 25 sandwiched between the first and second substrate modules 21, 22. A first polarizer 23 is formed at an outer side of the first substrate module 21. A second polarizer 24 is formed at an outer side of the second substrate module 22. The liquid crystal layer 25 includes twisted nematic liquid crystal molecules 251.

Figure 2:
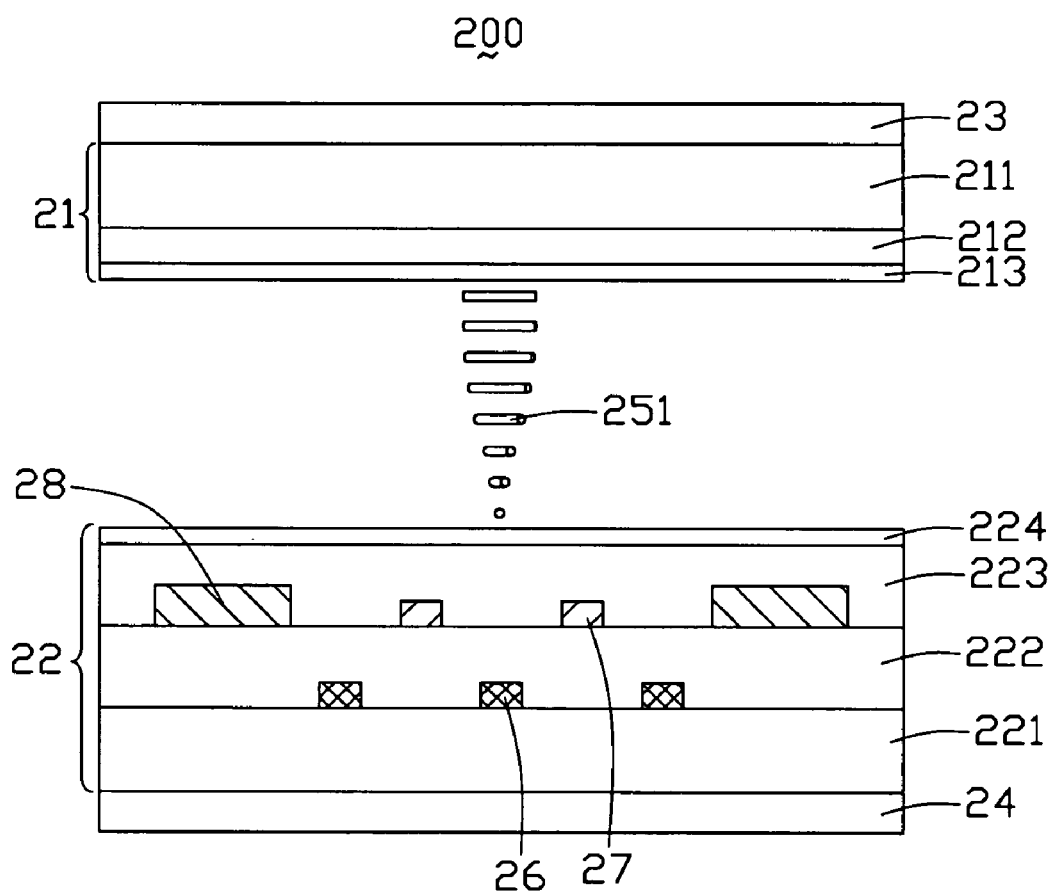
FIG. 2 is a schematic, side cross-sectional view of the IPS LCD of FIG. 1.

As shown in FIG. 2, the first substrate module 21 includes a first substrate 211, a color filter 212, and a first alignment layer 213 arranged in sequence. The second substrate module 22 includes a second substrate 221. A plurality of common electrodes 26 is formed on the second substrate 221, and an insulation layer 222 covers the common electrodes 26 and the second substrate 221. A plurality of strip-shaped pixel electrodes 27 and data lines 28 is formed on the insulation layer 222, and a passivation layer 223 covers the pixel electrodes 27, data lines 28 and insulation layer 222. A second alignment layer 224 is formed on the passivation layer 223. The insulation layer 222 is made of $SiO_2$ or $SiNx$, and the passivation layer 223 is made of $SiO_2$ or $SiNx$.

A pretilt angle of the first and second alignment layers 213, 224 is in a range of 0 to 10 degrees, with long axes of the liquid crystal molecules 251 being approximately parallel to the first and second substrates 211, 221. The first alignment layer 213 maintains a rubbing angle of approximately 90° relative to that of the second alignment film 224. An anchoring strength of the first alignment layer 213 is larger than that of the second alignment film 224.

A polarizing axis of the first polarizer 23 is parallel to the rubbing direction of the first alignment layer 213. The long axes of the liquid crystal molecules 251 adjacent the first alignment layer 213 are parallel to the polarizing axis of the first polarizer 23. The polarizing axes of the first and second polarizers 23, 24 are parallel to each other.

When no voltage is applied to the LCD 200, the liquid crystal molecules 251 are aligned such that they progressively twist a total of 90° from the second alignment film 224 to the first alignment layer 213. Light beams are emitted from a back light module (not shown) below the second polarizer 24. After passing through the second polarizer 24, the light beams become linearly-polarized light parallel to the polarizing axis of the second polarizer 24. Then the linearly-polarized light passes through the liquid crystal layer 25, and the polarizing direction of the linearly-polarized light is rotated about 90°. As a result, the linearly-polarized light has a polarization state perpendicular to the polarizing axis of the first polarizer 23, and is absorbed by the first polarizer 23. The linearly-polarized light is not output from the LCD 200 for displaying images. Thus, the IPS LCD 200 is in an off state.

Figure 3:
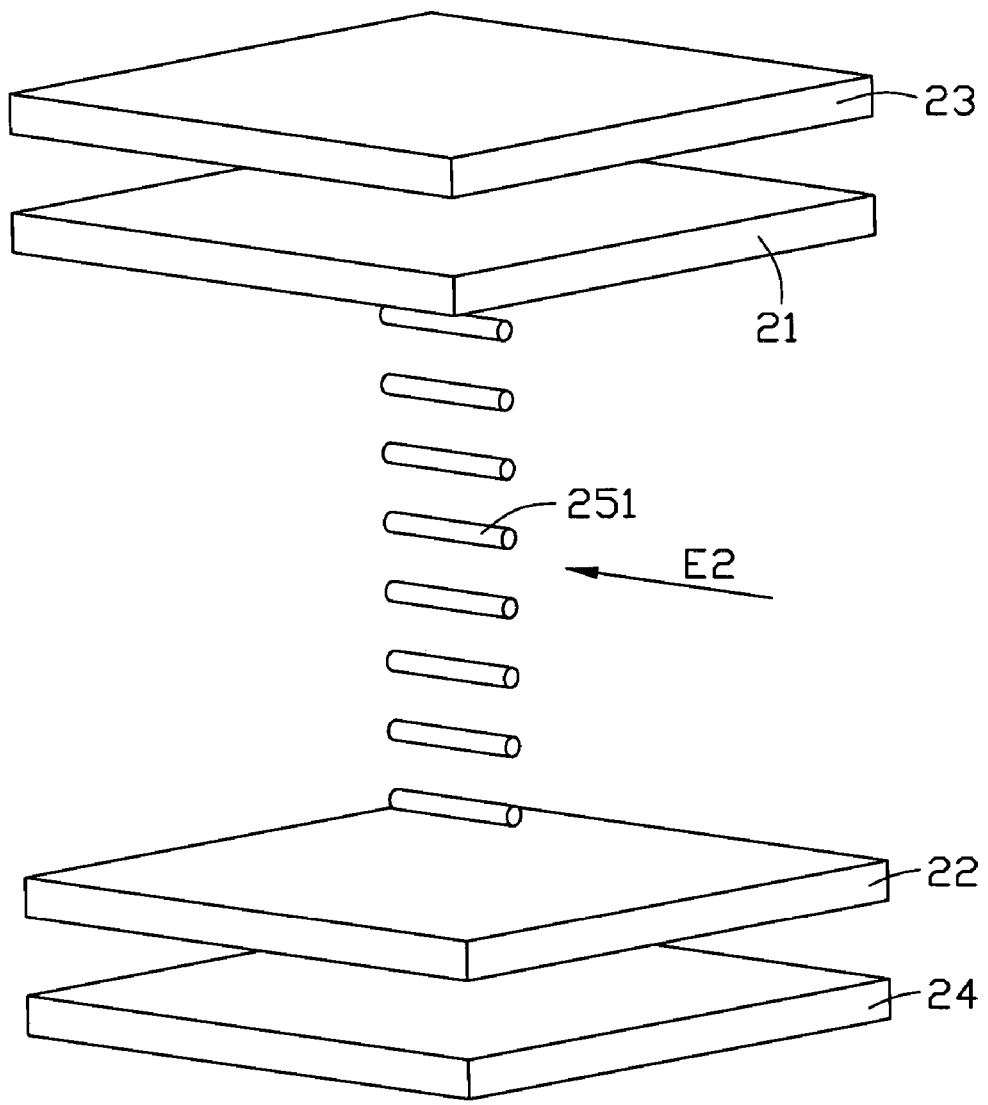
FIG. 3 is similar to FIG. 1, but showing the IPS LCD in an on state.

Referring to FIG. 3, this is similar to FIG. 1 but showing the LCD 200 in an on state. When a voltage is applied to the LCD 200, an electric field E2 is generated. The electric field E2 is parallel to the first and second substrates 211, 221, and the liquid crystal molecules 251 are driven to align with the electric field E2. Thus when the linearly-polarized light passes through the liquid crystal layer 25, the polarizing direction of the linearly-polarized light does not change. The linearly-polarized light can then pass through the first polarizer 23 for displaying images. Thus, the IPS LCD 200 is in an on state.

Because an anchoring strength of the second alignment film 224 is smaller than that of the first alignment film 213, the liquid crystal molecules 251 easily twist to the positions in which they are aligned with the electric field E2. The linearly-polarized light can then immediately pass through the first polarizer 23 for display. The liquid crystal molecules 251 twisting in a short time by the effect of the electric field E2 improves the response time of the IPS LCD 200.

Figure 4:
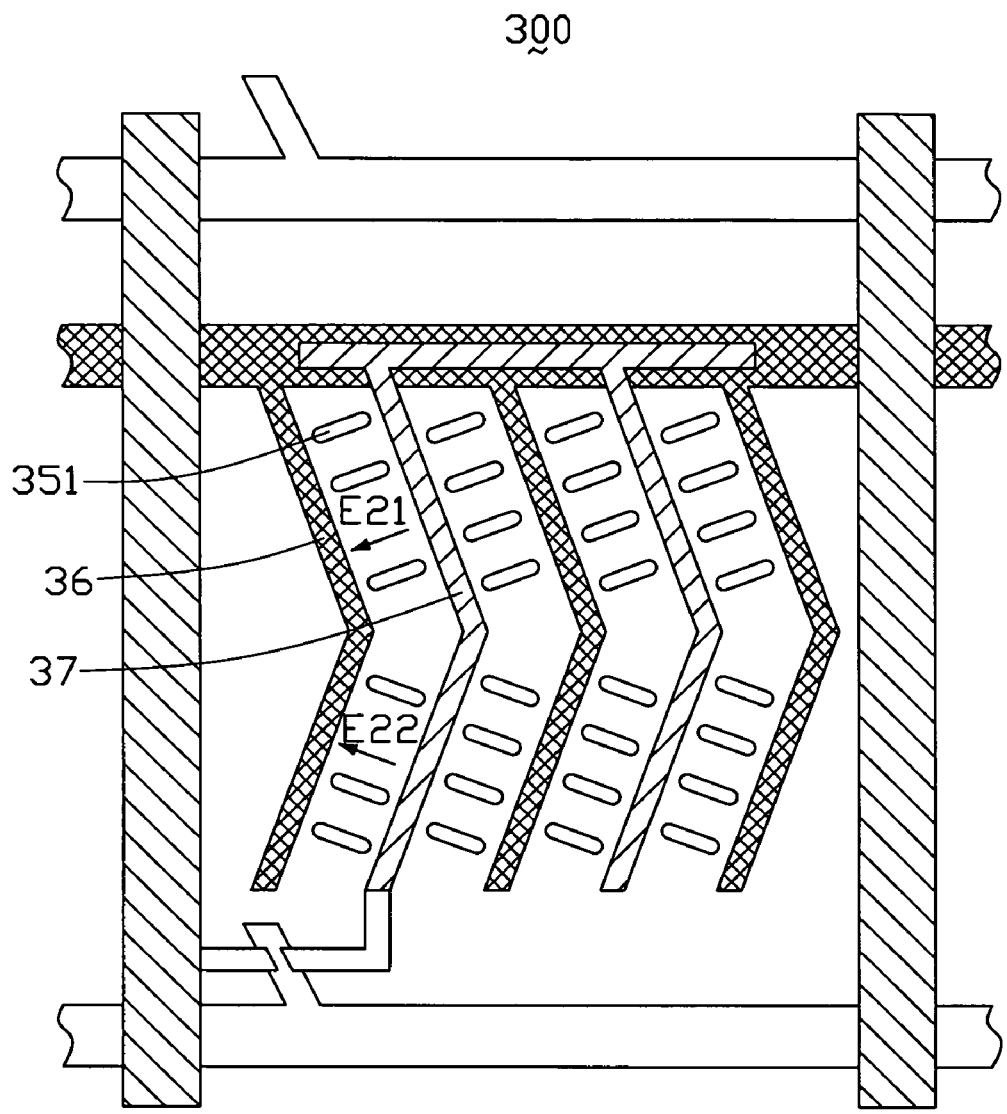
FIG. 4 is a schematic, top cross-sectional view of part of an IPS LCD according to a second embodiment of the present invention.

Referring to FIG. 4, this shows part of an IPS LCD 300 according to the second embodiment of the present invention. The IPS LCD 300 has a structure similar to that of the IPS LCD 200 of the first embodiment. However, common electrodes 36 and the pixel electrodes 37 of the IPS LCD 300 are rectilinearly bent. The common electrodes 36 and the pixel electrodes 37 are arranged parallel to each other in an alternate pattern. When a voltage is applied to the common electrodes 36 and the pixel electrodes 37, an electric field in two directions E21, E22 is generated. Liquid crystal molecules 351 twist in two different directions according to the electric field, for controlling a display of the IPS LCD 300. The liquid crystal molecules 351 help eliminate a color difference that may exist in the LCD 200 due to the single direction alignment of the liquid crystal molecules 251 thereof. That is, the liquid crystal molecules 351 can provide better performance and display characteristics for the IPS LCD 300.

Figure 5:
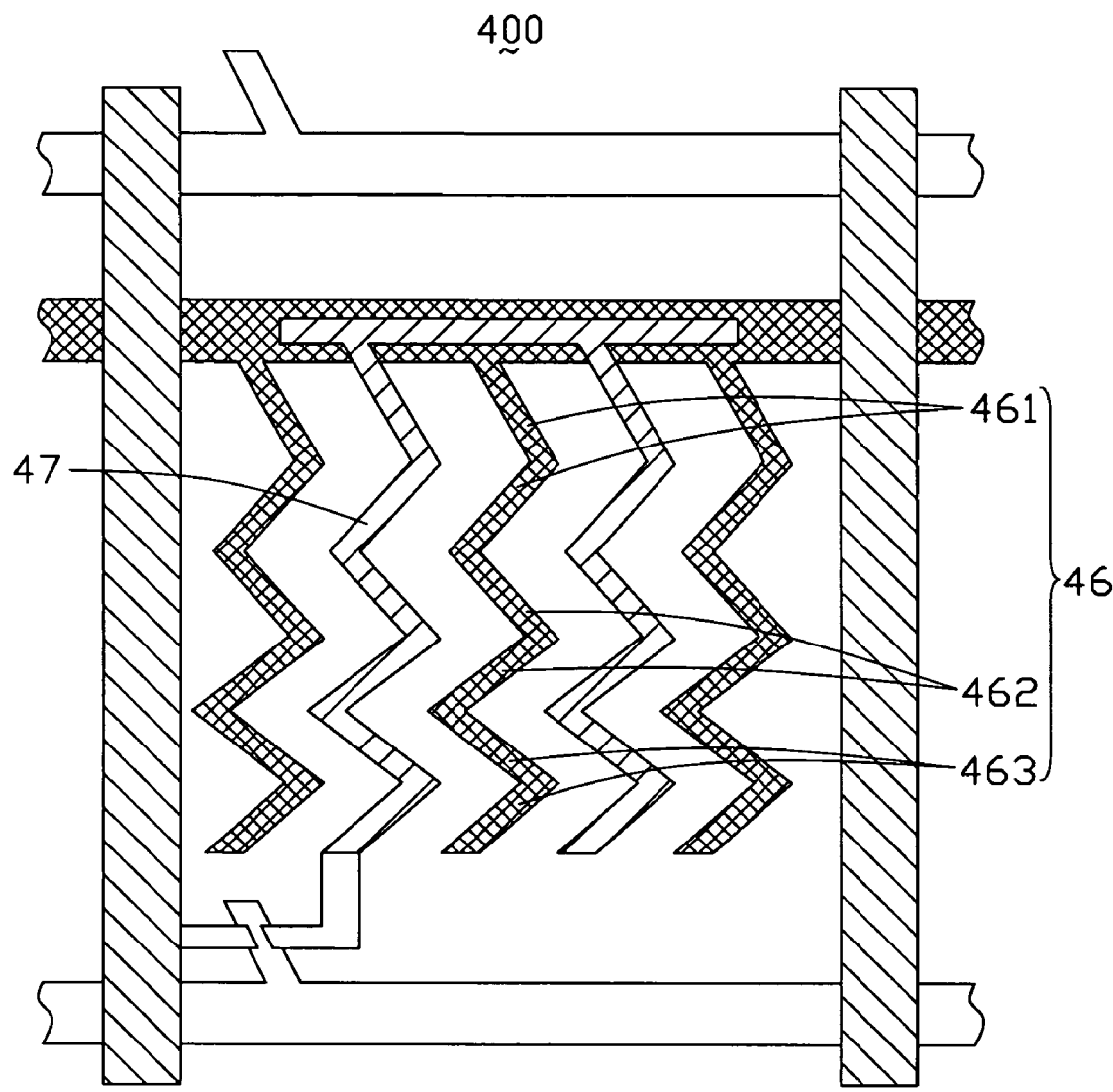
FIG. 5 is a schematic, top cross-sectional view of part of an IPS LCD according to a third embodiment of the present invention.
Figure 6:
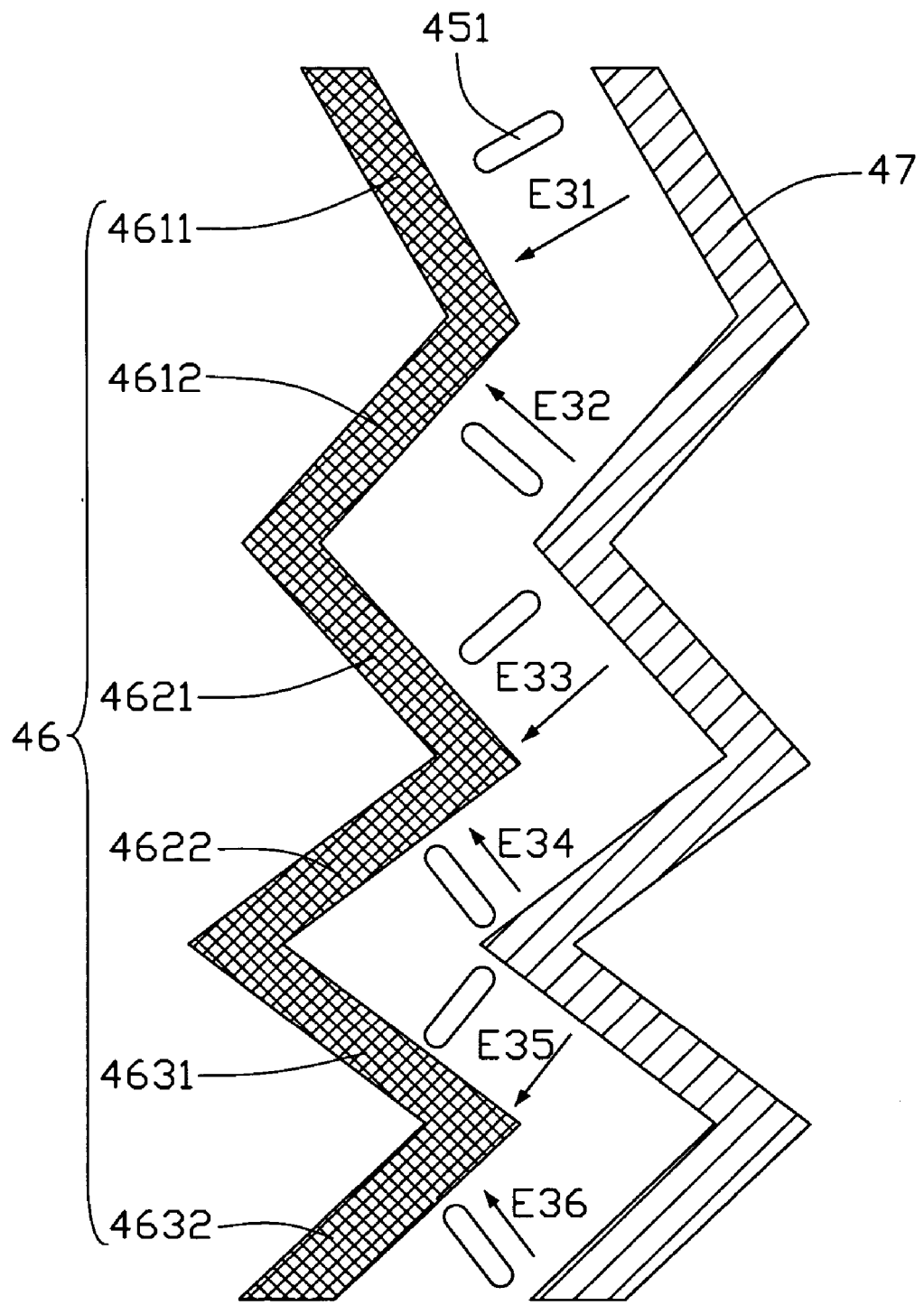
FIG. 6 is an enlarged view of one common electrode and one pixel electrode of the IPS LCD shown in FIG. 5, showing orientations of liquid crystal molecules between the common and pixel electrodes.

Referring to FIG. 5 and FIG. 6, these show part of an IPS LCD 400 according to the third embodiment of the present invention. The IPS LCD 400 has a structure similar to that of the IPS LCD 300 of the second embodiment. However, each of common electrodes 46 of the IPS LCD 400 has a zigzagged configuration, comprising a first bent portion 461, a second bent portion 462, and a third bent portion 463. As shown in FIG. 6, the first bent portion 461, the second bent portion 462, and the third bent portion 463 respectively have a first side 4611, 4621, 4631 and a second side 4612, 4622, 4632. The first sides 4611, 4621, 4631 are nonparallel relative to each other, and the second sides 4612, 4622, 4632 are nonparallel relative to each other. Each of pixel electrodes 47 of the IPS LCD 400 has a zigzagged configuration, with the common electrodes 36 and the pixel electrodes 37 being arranged parallel to each other in an alternate pattern. When a voltage is applied, an electric field having six directions E31, E32, E33, E34, E35, E36 is generated. Liquid crystal molecules 451 twist in six different directions accordingly. The liquid crystal molecules 451 help eliminate a color difference that may exist in the LCD 200 due to the single direction alignment of the liquid crystal molecules 251 thereof. In addition, the liquid crystal molecules 451 can also improve the viewing angle characteristics of the IPS LCD 400. That is, the liquid crystal molecules 451 can provide better performance and display characteristics for the IPS LCD 400.

Figure 7:
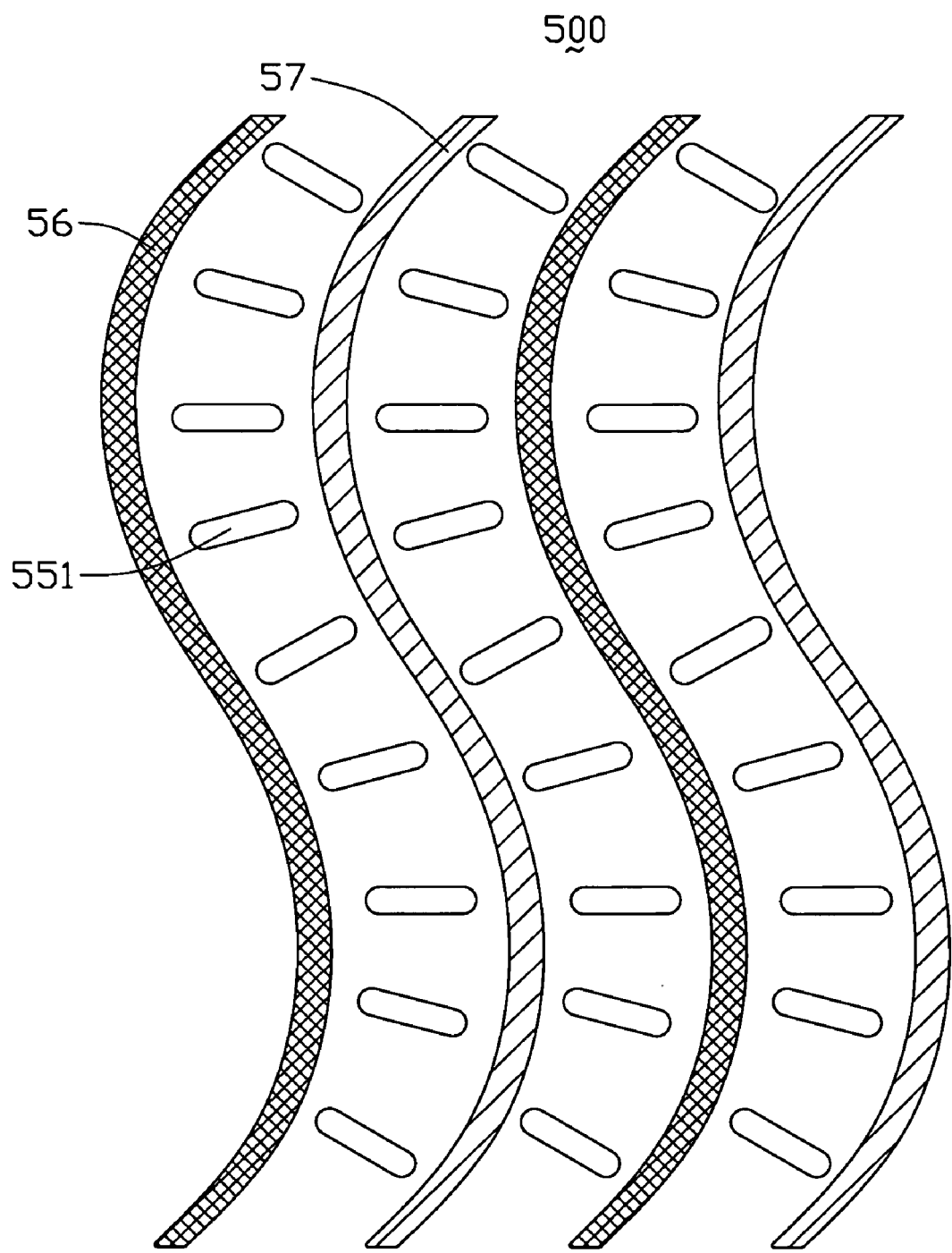
FIG. 7 is a schematic, top cross-sectional view of part of an IPS LCD according to a fourth embodiment of the present invention, showing two common electrodes and two pixel electrodes orientations of liquid crystal molecules between the common and pixel electrodes.

Referring to FIG. 7, this is a schematic, cross-sectional view of part of an IPS LCD 500 according to a fourth embodiment of the present invention. Common electrodes 56 and pixel electrodes 57 have wavelike configurations. When a voltage is applied, an electric field in many different directions is generated. Liquid crystal molecules 551 twist in many different directions accordingly. In alternative embodiments, the common and pixel electrodes 56, 57 can be arc-shaped, arcuate, or curvilinear, or have other similar suitable configurations.

Figure 8:
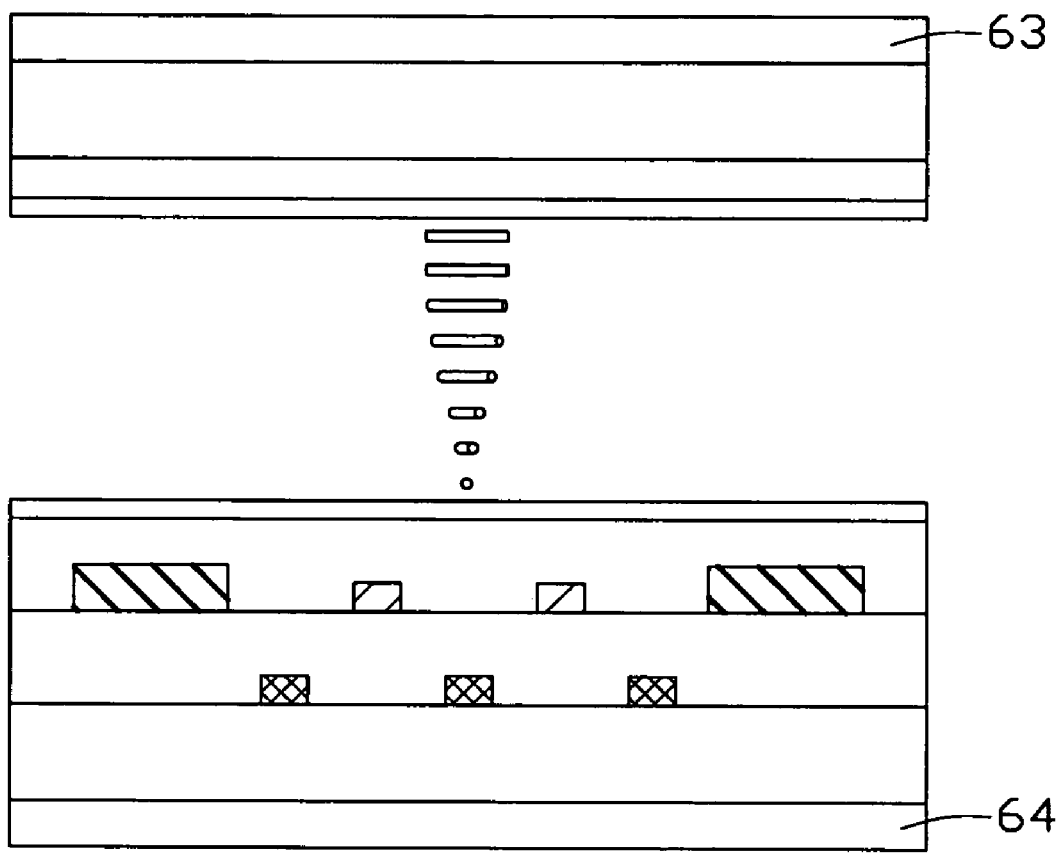
FIG. 8 is a schematic, side cross-sectional view of part of an IPS LCD according to a fifth embodiment of the present invention.
Figure 9:
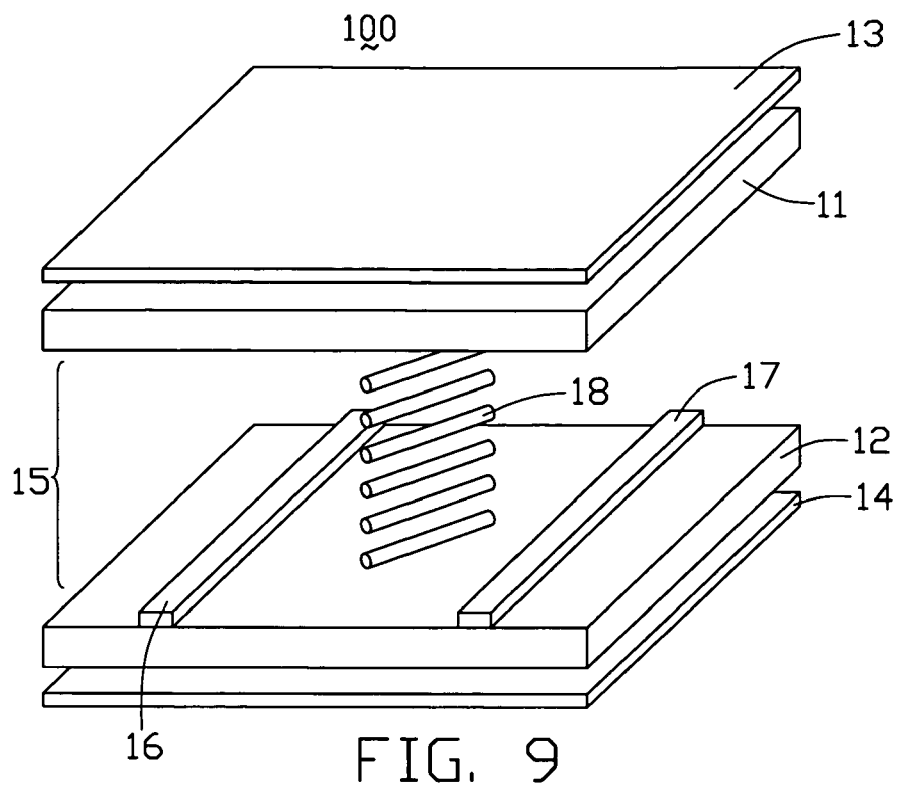
FIG. 9 is a schematic, exploded isometric view of a conventional IPS LCD, showing the IPS LCD in an off state.
Figure 10:
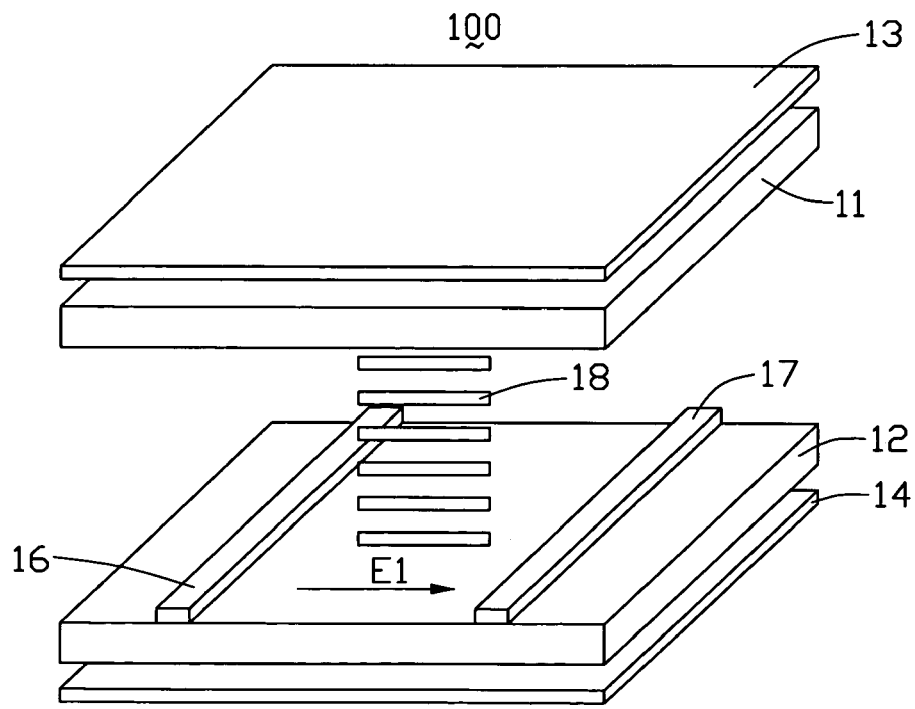
FIG. 10 is similar to FIG. 9, but showing the IPS LCD in an on state.

Referring to FIG. 8, this is a schematic, cross-sectional view of an IPS LCD 600 according to a fifth embodiment of the present invention. The IPS LCD 600 has a structure similar to that of the IPS LCD 200 of FIG. 2 of the first embodiment. However, polarizing axes of first and second polarizers 63, 64 of the IPS LCD 600 are perpendicular to each other. Thus, the IPS LCD 600 is in an on state when no voltage is applied.

It is to be understood, however, that even though numerous characteristics and advantages of the preferred embodiments have been set out in the foregoing description, together with details of the structures and functions of these embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An in-plane switching liquid crystal display, comprising:
   a first substrate and a second substrate opposite to each other;
   a twisted nematic liquid crystal layer sandwiched between the first and second substrates;
   a first polarizer disposed at an outer surface of the first substrate, and a second polarizer disposed at an outer surface of the second substrate, polarizing axes of the first and second polarizers being parallel to each other;
   a plurality of pixel electrodes and a plurality of common electrodes disposed at the second substrate; and
   a first alignment film disposed at an inner surface of the first substrate and a second alignment film disposed at an inner surface of the second substrate, wherein the first alignment film maintains a rubbing angle of approximately 90° relative to die second alignment film;
   wherein an anchoring strength of the first alignment film is larger than that of the second alignment film.

2. The in-plane switching liquid crystal display as claimed in claim 1, wherein long axes of liquid crystal molecules adjacent to the second alignment film are parallel to the polarizing axis of the second polarizer.

3. The in-plane switching liquid crystal display as claimed in claim 1, wherein the pixel electrodes and the common electrodes are strip-shaped.

4. The in-plane switching liquid crystal display as claimed in claim 1, wherein an electric field generated between the pixel electrodes and the common electrodes has at least two different directions.

5. The in-plane switching liquid crystal display as claimed in claim 4, wherein the pixel electrodes and common electrodes have a rectilinearly bent shape.

6. The in-plane switching liquid crystal display as claimed in claim 4, wherein the pixel electrodes and common electrodes have a curvilinear configuration.

7. The in-plane switching liquid crystal display as claimed in claim 4, wherein the pixel electrodes and common electrodes are arc-shaped or arcuate.

8. The in-plane switching liquid crystal display as claimed in claim 4, wherein the pixel electrodes and common electrodes have a wavelike configuration.

9. An in-plane switching liquid crystal display, comprising:
   a first substrate and a second substrate opposite to each other;
   a twisted nematic liquid crystal layer sandwiched between the first and second substrates;
   a first polarizer disposed at an outer surface of the first substrate, and a second polarizer disposed at an outer surface of the second substrate, polarizing axes of the first and second polarizers being perpendicular to each other;
   a plurality of pixel electrodes and a plurality of common electrodes disposed at the second substrate;
   a first alignment film disposed at an inner surface of the first substrate, and a second alignment film disposed at an inner surface of the second substrate, wherein the first alignment film maintains a rubbing angle of approximately 90° relative to the second alignment film;
   wherein an anchoring strength of the first alignment film is larger than that of the second alignment film.

10. The in-plane switching liquid crystal display as claimed in claim 9, wherein the pixel electrodes and the common electrodes are strip-shaped.

11. The in-plane switching liquid crystal display as claimed in claim 9, wherein the pixel electrodes and common electrodes have a rectilinearly bent shape.

12. The in-plane switching liquid crystal display as claimed in claim 9, wherein the pixel electrodes and common electrodes have a curvilinear configuration.

13. The in-plane switching liquid crystal display as claimed in claim 9, wherein the pixel electrodes and common electrodes are arc-shaped or arcuate.

14. The in-plane switching liquid crystal display as claimed in claim 9, wherein the pixel electrodes and common electrodes have wavelike configuration.

* * * * *